US012560120B2

(12) United States Patent
DiBenedetto et al.

(10) Patent No.: US 12,560,120 B2
(45) Date of Patent: Feb. 24, 2026

(54) HIGH PRESSURE CLEARANCE CONTROL SYSTEM FOR GAS TURBINE ENGINE

(71) Applicant: RTX Corporation, Farmington, CT (US)

(72) Inventors: Enzo DiBenedetto, Berlin, CT (US); Philip Robert Rioux, Lisbon Falls, ME (US)

(73) Assignee: RTX CORPORATION, Farmington, CT (US)

( * ) Notice: Subject to any disclaimer, the term of this patent is extended or adjusted under 35 U.S.C. 154(b) by 852 days.

(21) Appl. No.: 16/448,775

(22) Filed: Jun. 21, 2019

(65) Prior Publication Data

US 2020/0400073 A1 Dec. 24, 2020

(51) Int. Cl.
| | |
|---|---|
| *F02C 6/08* | (2006.01) |
| *F01D 25/24* | (2006.01) |
| *F02C 7/18* | (2006.01) |
| *F02K 3/06* | (2006.01) |

(52) U.S. Cl.
CPC ............... *F02C 7/18* (2013.01); *F01D 25/24* (2013.01); *F02C 6/08* (2013.01); *F02K 3/06* (2013.01); *F05D 2220/32* (2013.01); *F05D 2260/232* (2013.01); *F05D 2260/606* (2013.01)

(58) Field of Classification Search
None
See application file for complete search history.

(56) References Cited

U.S. PATENT DOCUMENTS

| | | | |
|---|---|---|---|
| 4,329,114 A | | 5/1982 | Johnston et al. |
| 4,338,061 A | | 7/1982 | Beitler et al. |
| 4,683,716 A | | 8/1987 | Wright et al. |
| 5,160,241 A | * | 11/1992 | Glynn .................. F04D 29/584 |
| | | | 415/144 |
| 5,351,478 A | | 10/1994 | Walker et al. |

(Continued)

FOREIGN PATENT DOCUMENTS

| | | |
|---|---|---|
| EP | 3181830 A1 | 6/2017 |
| GB | 2054741 A | 2/1981 |
| GB | 2267312 A | 12/1993 |

OTHER PUBLICATIONS

European Search Report for Application No. 20 18 06 15; Date Issued: Oct. 28, 2020.

*Primary Examiner* — Devon C Kramer
*Assistant Examiner* — Jacek Lisowski
(74) *Attorney, Agent, or Firm* — CANTOR COLBURN LLP

(57) ABSTRACT

A high pressure compressor for a gas turbine engine. The high pressure compressor including: a clearance control system, the clearance control system including: a control valve fluidly coupled to a source of bleed air of the high pressure compressor, the control valve configured for movement between a first position and a second position; an insulated pipe fluidly coupled to the control valve; and wherein the control valve redirects a portion of the source of bleed air towards an inner case structure of the high pressure compressor and thereafter to the insulated pipe when it is in the first position and wherein the source of bleed air is not redirected towards the inner case structure of the high pressure compressor and the insulated pipe when the control valve is in the second position.

20 Claims, 6 Drawing Sheets

(56) References Cited

U.S. PATENT DOCUMENTS

| | | | |
|---|---|---|---|
| 6,412,270 B1 * | 7/2002 | Mortzheim | ............. F01D 11/04 |
| | | | 415/144 |
| 6,732,530 B2 | 5/2004 | Laurello et al. | |
| 9,458,855 B2 | 10/2016 | Dierksmeier et al. | |
| 2017/0175769 A1 | 6/2017 | Sun et al. | |
| 2017/0268535 A1 * | 9/2017 | Mondal | ................ F04D 29/642 |
| 2019/0003335 A1 * | 1/2019 | Evans | ....................... F01D 5/08 |

* cited by examiner

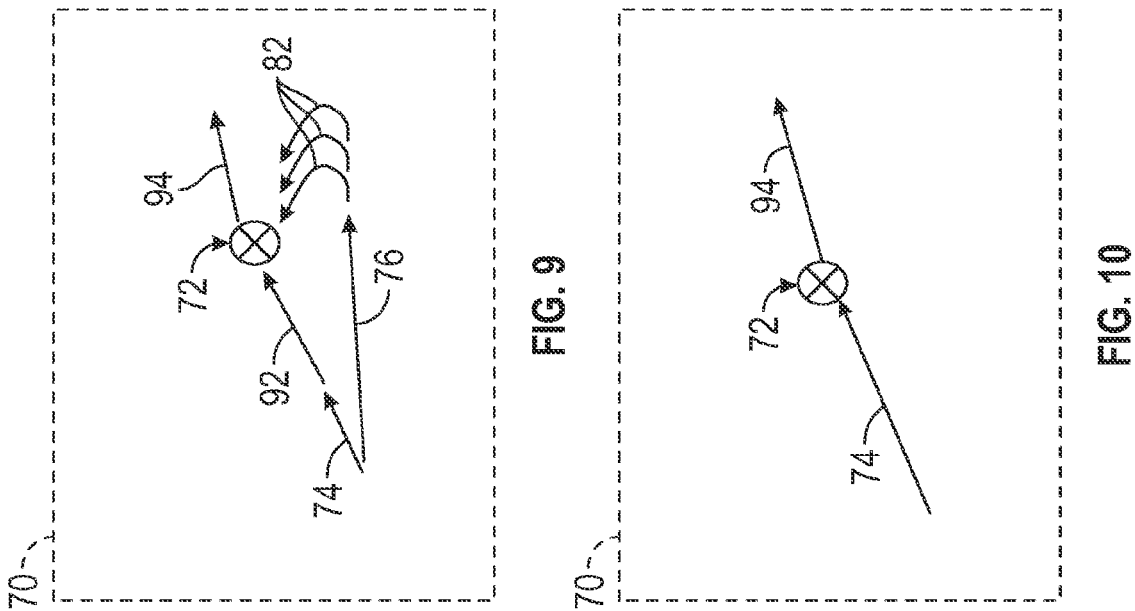
FIG. 9
FIG. 10
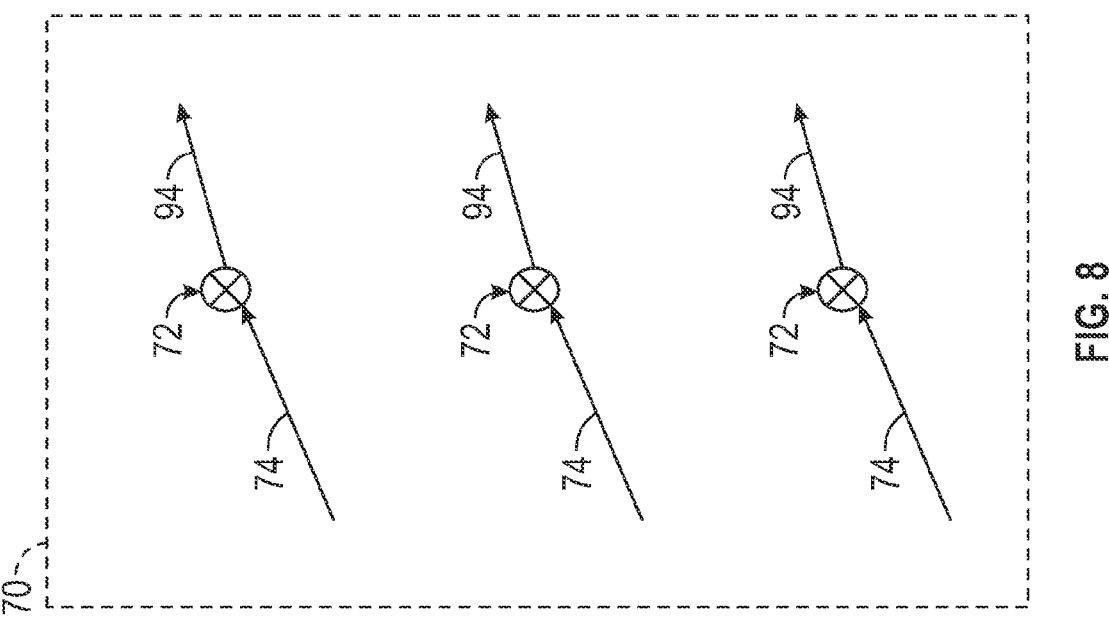
FIG. 8

HIGH PRESSURE CLEARANCE CONTROL SYSTEM FOR GAS TURBINE ENGINE

BACKGROUND

Exemplary embodiments pertain to the art of gas turbine engines and, more particularly, to a compressor clearance control system.

Improving gas turbine high pressure compressor efficiency is desired. A major factor to achieve this is to reduce the clearance between the blade tips of one or more stages and their corresponding outer air seals at a desired mission point, such as a cruise condition.

One method of prior efforts utilize a portion of upstream, cooler compressor bleed flow to cool the rear inner case structure that houses the outer air seals. This flow is typically channeled between an intermediate case structure and the inner case structure. The cooling effect then contracts the outer air seal diameter and reduces the clearance to the blade tips. This flow is typically controlled by a valve, to turn the system on or off, and is then exhausted downstream into an internal position prior to exiting the outer engine case structure, where it then performs additional cooling functions for other engine components, such as the high pressure turbine or other structures. A limitation of this arrangement is that heat up of this exhausted air occurs from the hot position components, which then negatively impacts performance of other engine components.

BRIEF DESCRIPTION

Disclosed is a high pressure compressor for a gas turbine engine. The high pressure compressor including: a clearance control system, the clearance control system including: a control valve fluidly coupled to a source of bleed air of the high pressure compressor, the control valve configured for movement between a first position and a second position: an insulated pipe fluidly coupled to the control valve; and wherein the control valve redirects a portion of the source of bleed air towards an inner case structure of the high pressure compressor and thereafter to the insulated pipes when it is in the first position and wherein the source of bleed air is not redirected towards the inner case structure of the high pressure compressor and the insulated pipe when the control valve is in the second position.

In addition to one or more of the features described above, or as an alternative to any of the foregoing embodiments, the source of bleed air is from a stage 3 of the high pressure compressor.

In addition to one or more of the features described above, or as an alternative to any of the foregoing embodiments, the inner case structure is a stage 6 inner case structure of the high pressure compressor.

In addition to one or more of the features described above, or as an alternative to any of the foregoing embodiments, the control valve is one of a plurality of control valves and the insulated pipe is one of a plurality of insulated pipes each of the plurality of insulated pipes being fluidly coupled to one of the plurality of control valves.

In addition to one or more of the features described above, or as an alternative to any of the foregoing embodiments, the clearance control system comprises only a single control valve and the insulated pipe is one of a plurality of insulated pipes each of the plurality of insulated pipes being fluidly coupled to the single control valve.

In addition to one or more of the features described above, or as an alternative to any of the foregoing embodiments, the source of bleed air is redirected to the control valve without it being mixed with any other source of bleed air.

In addition to one or more of the features described above, or as an alternative to any of the foregoing embodiments, the plurality of insulated pipes thermally insulate the redirected portion of the source of bleed air from other sources of bleed air that are at a higher temperature than the redirected portion of the source of bleed air.

In addition to one or more of the features described above, or as an alternative to any of the foregoing embodiments, the control valve mixes the redirected portion of the source of bleed air with a portion of the source of bleed air that has not been redirected to provide a source of mixed bleed air, when it is in the first position.

Also disclosed is a gas turbine engine. The gas turbine engine having: a fan section: a compressor section, the compressor section having a low pressure compressor and a high pressure compressor: a combustor section: a turbine section; and wherein the high pressure compressor includes a clearance control system, the clearance control system comprising: a control valve fluidly coupled to a source of bleed air of the high pressure compressor, the control valve configured for movement between a first position and a second position: an insulated pipe fluidly coupled to the control valve; and wherein the control valve redirects a portion of the source of bleed air towards an inner case structure of the high pressure compressor and thereafter to the insulated pipe when it is in the first position and wherein the source of bleed air is not redirected towards the inner case structure of the high pressure compressor and the insulated pipe when the control valve is in the second position.

In addition to one or more of the features described above, or as an alternative to any of the foregoing embodiments, the source of bleed air is from a stage 3 of the high pressure compressor.

In addition to one or more of the features described above, or as an alternative to any of the foregoing embodiments, the inner case structure is a stage 6 inner case structure of the high pressure compressor.

In addition to one or more of the features described above, or as an alternative to any of the foregoing embodiments, the control valve is one of a plurality of control valves and the insulated pipe is one of a plurality of insulated pipes each of the plurality of insulated pipes being fluidly coupled to one of the plurality of control valves.

In addition to one or more of the features described above, or as an alternative to any of the foregoing embodiments, the clearance control system comprises only a single control valve and the insulated pipe is one of a plurality of insulated pipes each of the plurality of insulated pipes being fluidly coupled to the single control valve.

In addition to one or more of the features described above, or as an alternative to any of the foregoing embodiments, the source of bleed air is redirected to the control valve without it being mixed with any other source of bleed air.

In addition to one or more of the features described above, or as an alternative to any of the foregoing embodiments, the plurality of insulated pipes thermally insulate the redirected portion of the source of bleed air from other sources of bleed air that are at a higher temperature than the redirected portion of the source of bleed air.

In addition to one or more of the features described above, or as an alternative to any of the foregoing embodiments, the control valve mixes the redirected portion of the source of bleed air with a portion of the source of bleed air that has not been redirected to provide a source of mixed bleed air, when it is in the first position.

In addition to one or more of the features described above, or as an alternative to any of the foregoing embodiments, the source of mixed bleed air is provided to the turbine section.

Also disclosed is a method of cooling a portion of a high pressure compressor of a gas turbine engine. The method including the steps of: fluidly coupling a control valve fluidly of a clearance control system to a source of bleed air of the high pressure compressor, the control valve configured for movement between a first position and a second position: fluidly coupling an insulated pipe to the control valve; and redirecting a portion of the source of bleed air towards an inner case structure of the high pressure compressor and thereafter to the insulated pipe when the control valve is in the first position and wherein the source of bleed air is not redirected towards the inner case structure of the high pressure compressor and the insulated pipe when the control valve is in the second position.

In addition to one or more of the features described above, or as an alternative to any of the foregoing embodiments, the source of bleed air is from a stage 3 of the high pressure compressor, and wherein the control valve is one of a plurality of control valves and the insulated pipe is one of a plurality of insulated pipes each of the plurality of insulated pipes being fluidly coupled to one of the plurality of control valves.

In addition to one or more of the features described above, or as an alternative to any of the foregoing embodiments, the inner case structure is a stage 6 inner case structure of the high pressure compressor, and wherein the clearance control system comprises only a single control valve and the insulated pipe is one of a plurality of insulated pipes each of the plurality of insulated pipes being fluidly coupled to the single control valve.

BRIEF DESCRIPTION OF THE DRAWINGS

The following descriptions should not be considered limiting in any way. With reference to the accompanying drawings, like elements are numbered alike:

FIG. 8 is a schematic illustration of the compressor clearance control system according to an embodiment with control valves of the compressor clearance control system in a second position or off position:

FIG. 9 is a schematic illustration of the compressor clearance control system according to another embodiment with a single control valve of the compressor clearance control system in a first position or on position; and FIG. 10 is a schematic illustration of the compressor clearance control system of FIG. 9 with the single control valve of the compressor clearance control system in a second position or off position.

DETAILED DESCRIPTION

A detailed description of one or more embodiments of the disclosed apparatus and method are presented herein by way of exemplification and not limitation with reference to the Figures.

Figure 1:
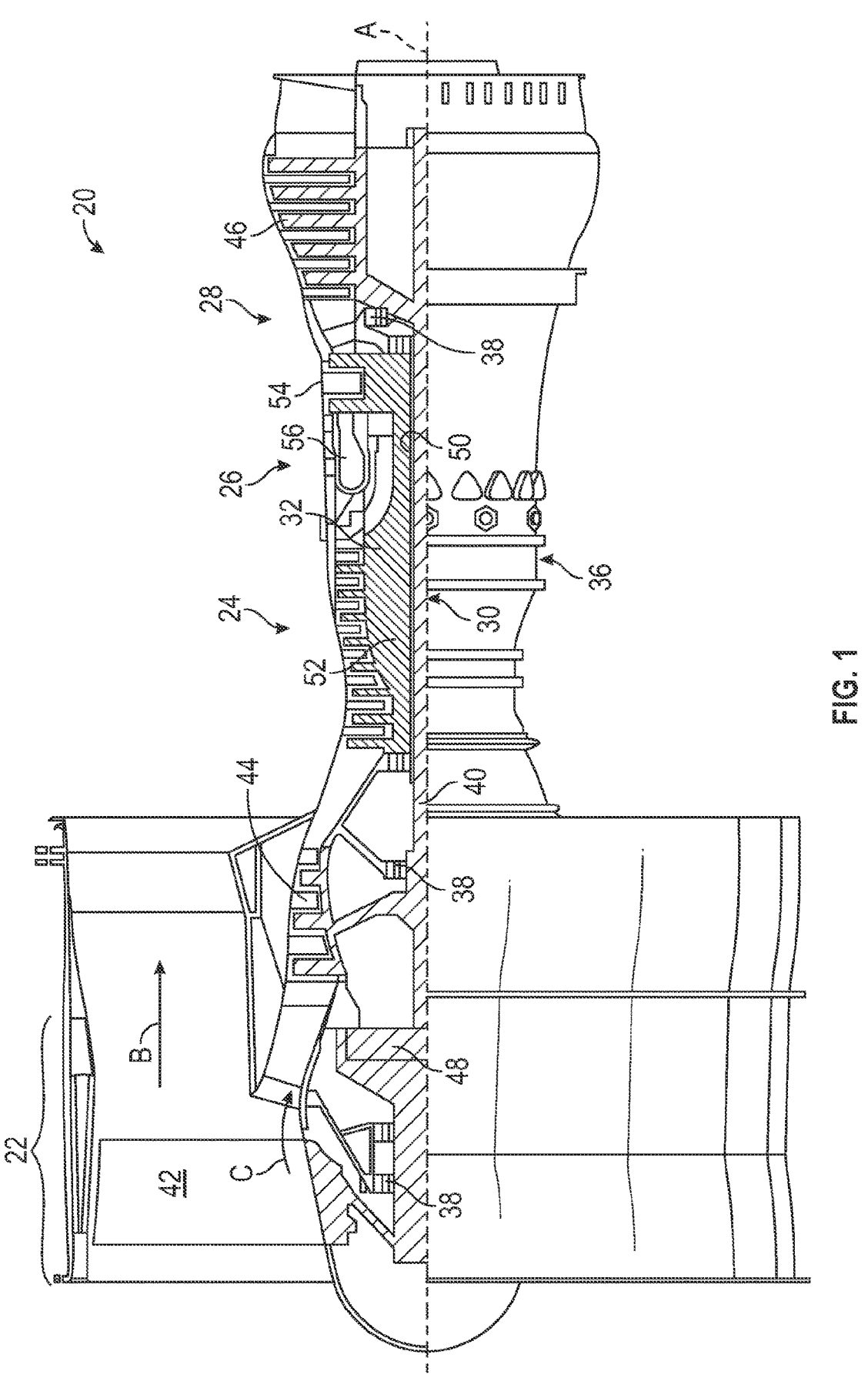
FIG. 1 is a side, partial cross-sectional view of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five (5:1). Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 feet (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram \, ° \, R)/(518.7° \, R)]^{0.5}$. The "Low corrected fan tip speed" as disclosed herein according to one non-limiting embodiment is less than about 1150 ft/second (350.5 m/sec).

Figure 2:
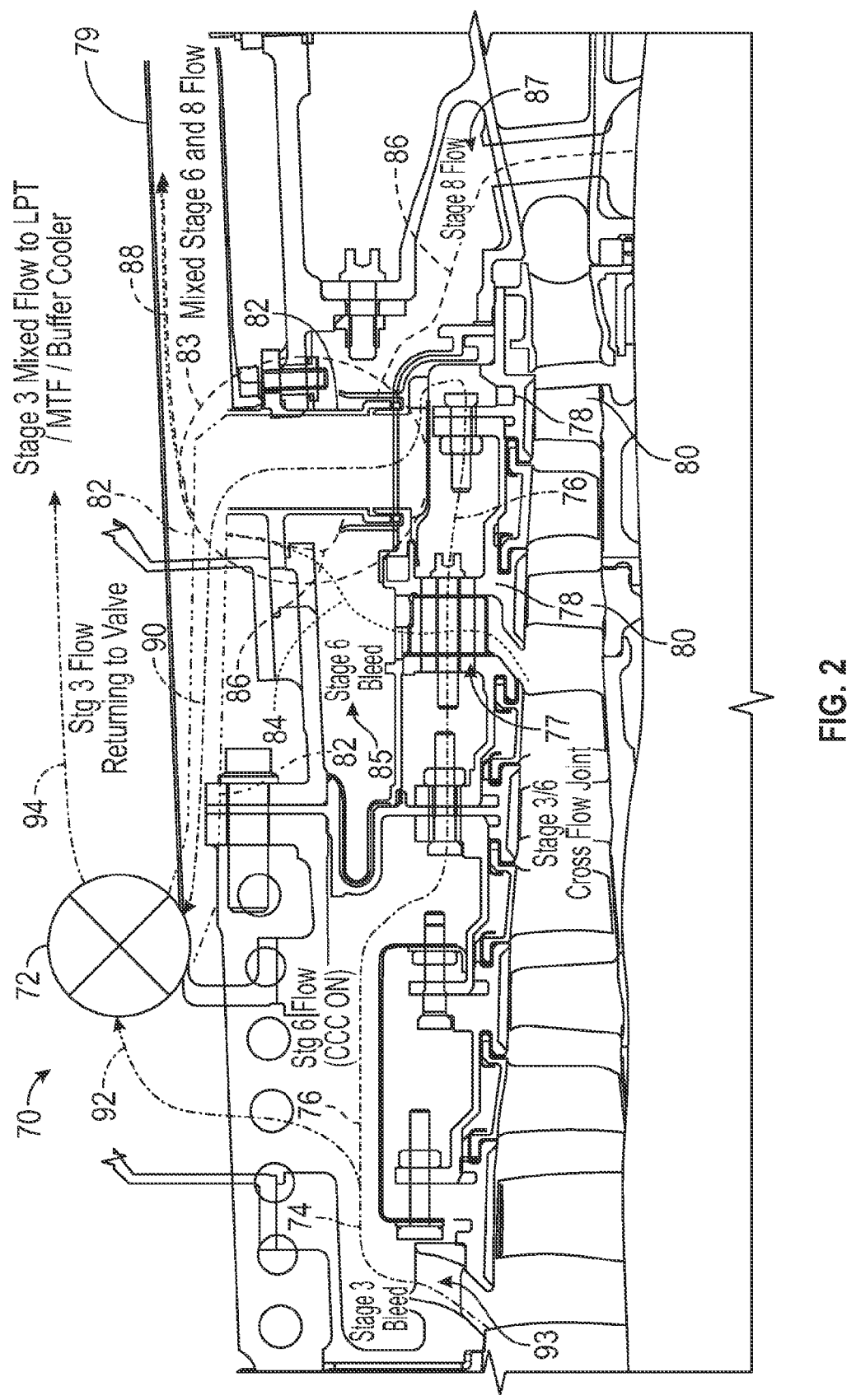
FIG. 2 is a view of a compressor clearance control system with a control valve of the compressor clearance control system in a first position or on position.
Figure 3:
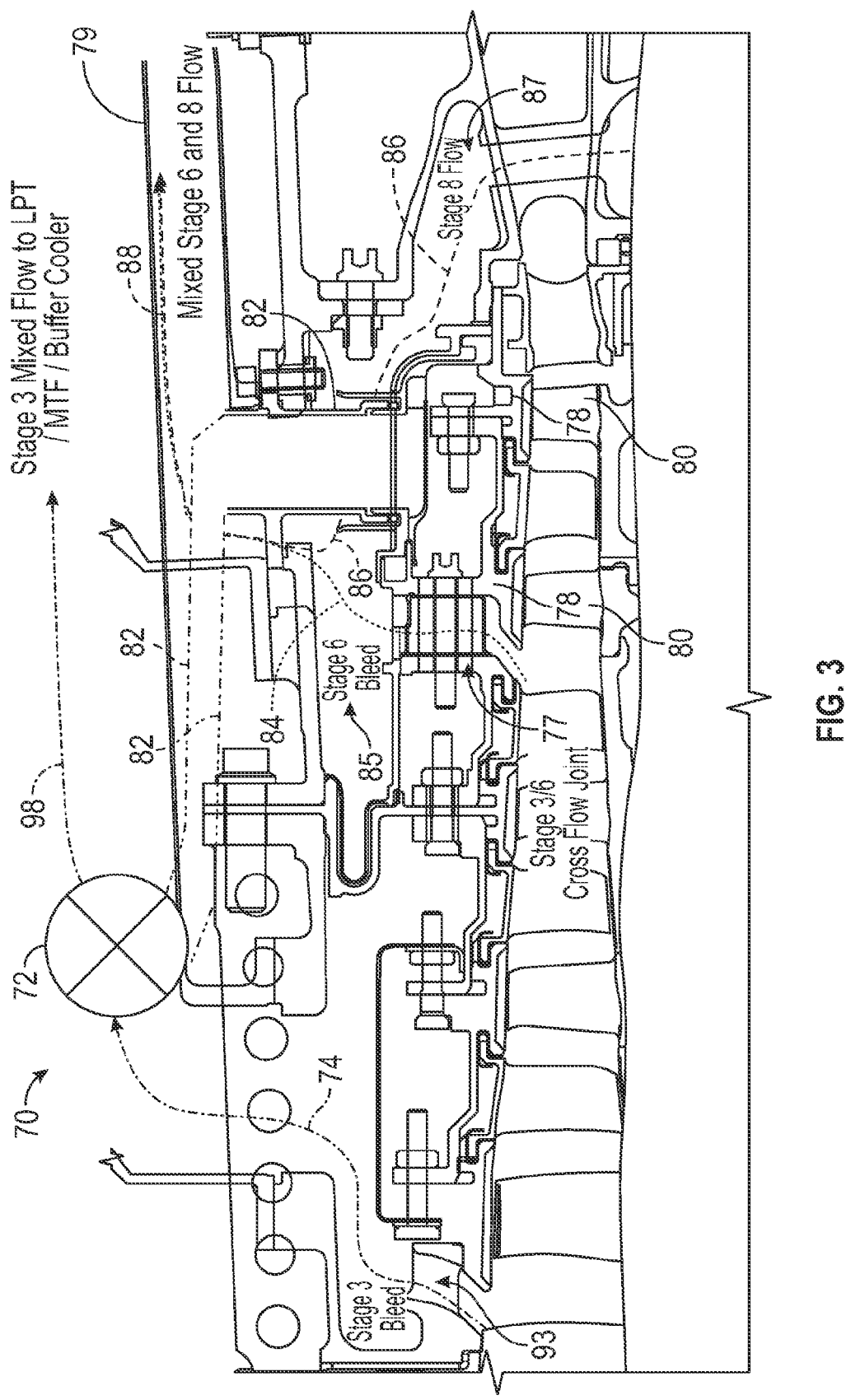
FIG. 3 is a view of a compressor clearance control system with a control valve of the compressor clearance control system in a second position or off position.

FIG. 2 illustrates a compressor clearance control system 70 of the present disclosure with a control valve 72 of the compressor clearance control system 70 in a first position. It being understood that the control valve 72 is schematically illustrated in FIGS. 2 and 3 and its actual size and location may vary from that which is illustrated in the attached FIGS. For example and in one embodiment, the control valve 72 may be located on an exterior surface of the compressor case.

In addition and although only one control valve 72 is illustrated, other embodiments of the present disclosure contemplate a compressor clearance control system 70 where several control valves 72 are employed. The control valve or valves 72 is/are fluidly coupled to a source of bleed air of the high pressure compressor illustrated by dashed lines 74. When the control valve 72 is in the first position, a portion of the source of bleed air illustrated by dashed lines 76 is re-directed towards an inner case structure 78 of the high pressure compressor 52. This portion of the source of bleed air illustrated by dashed lines 76 may be referred to as re-directed bleed air. As such and when the control valve 72 is in the first position illustrated in FIG. 2, the inner case structure 78 of the high pressure compressor 52 is cooled in order to minimize the clearance between the inner case structure 78 and blades 80 of the high pressure compressor 52 in order to achieve improved performance of the high pressure compressor 52 during certain operating conditions. In one embodiment, the re-directed bleed air illustrated by dashed lines 76 travels through a stage 3/6 cross flow joint 77 of the high pressure compressor 52.

The compressor clearance control system 70 of the present disclosure also includes a plurality of insulated pipes 82 (only one being shown in FIGS. 2 and 3) fluidly coupled to the control valve 72 at one end and configured to receive the re-directed bleed air after it has cooled the inner case structure 78 of the high pressure compressor 52 at the other end. A portion of these plurality of insulated pipes 82 are located in the area 83 illustrated in FIG. 2 (between the inner case structure 78 and an outer case structure 79 of the high pressure compressor 52) while other portions are illustrated schematically by the dashed lines 82. In one non-limiting embodiment, the plurality of insulated pipes 82 are insulated by a bonded thermal barrier coating, air (trapped between two layers of the pipe (e.g., double walled pipe), a separable blanket, foil, or an encapsulated foil type layer positioned about or around the pipes. This insulation prevents the re-directed bleed air after it has cooled the inner case structure 78 from being further heated as it is insulated from other bleed flows that are typically of a higher temperature.

As mentioned above, a plurality of control valves 72 may be employed with a plurality of insulated pipes 82. In one non-limiting embodiment, a plurality of control valves 72 are employed wherein each individual control valve 72 is only in fluid communication with a single insulated pipe 82 (e.g., one control valve 72 for each insulated pipe 82). Alternatively and in order to reduce the number of control valves 72, a plurality of insulated pipes 82 (e.g., more than one) may be in fluid communication with a single control valve 72. Of course, numerous other configurations are considered to be within the scope of the present disclosure.

In accordance with the present disclosure, the plurality of insulated pipes 82 thermally insulate the re-directed bleed air after it has cooled the inner case structure 78 from other bleed air flows that are typically of a higher temperature than the re-directed bleed air after it has cooled the inner case structure 78. These bleed air flows are illustrated by the dashed lines 84 and 86, which may be a stage 6 (85) and a stage 8 (87) bleed air flows, respectively of the high pressure compressor 52. A mixed stage 6 and stage 8 air flow is illustrated by dashed lines 88.

By thermally insulating the re-directed bleed air after it has cooled the inner case structure 78 from other bleed air flows (e.g., 84 and 86) the re-directed bleed air flow can be provided to the control valve 72 after it has cooled the inner case structure 78 without being significantly heated by the other bleed air flows (e.g., 84 and 86). As such, the re-directed bleed air flow is provided to the control valve 72 at a temperature that is much cooler than if it were mixed with the other bleed air flows (e.g., 84 and 86). This re-directed bleed air flow after cooling of the inner case structure 78 is illustrated by dashed lines 90. In one embodiment of the present disclosure the re-directed bleed air flow after cooling of the inner case structure (e.g., dashed lines 90) is redirected to the control valve 72 without it being mixed with any other source of bleed air prior to it reaching the control valve 72.

Once this re-directed bleed air flow 90 is received at the control valve 72 it is mixed with a source of the bleed air that has not be redirected and subsequently heated, which is illustrated by the dashed lines 92. Thus, the re-directed bleed air flow 90 is mixed with bleed air 92 to provide a mixed air flow illustrated by dashed lines 94. This mixed air flow 94 can be provided to the turbine section (e.g., low pressure turbine, mid-turbine frame, etc.) or buffer cooler of the gas turbine engine 20. As such, the mixed air flow 94 is not substantially heated as the re-directed bleed air flow 90, while slightly higher in temperature due to its cooling of the inner case structure 78, has not been excessively heated by bleed air flows 84 and 86, since the bleed air flow 90 is insulated by pipes 82. Thus, the mixed air flow 94 while slightly heated by bleed air flow 90 will still be at a temperature low enough to provide the desired cooling at the turbine section (e.g., low pressure turbine, mid-turbine frame, etc.) or buffer cooler.

In one non-limiting embodiment of the present disclosure, the source of bleed air is from a stage 3 of the high pressure compressor or other upstream bleed air 93. In one non-limiting embodiment of the present disclosure, the inner case structure is a stage 6 inner case structure of the high pressure compressor.

FIG. 3 illustrates a compressor clearance control system 70 of the present disclosure with a control valve 72 of the compressor clearance control system 70 in a second position or off position. In this position, the control valve 72 is only fluidly coupled to the source of bleed air illustrated by dashed lines 74 and no portion of the bleed air is re-directed towards the inner case structure 78 of the high pressure compressor 52. As such, the bleed air 74 fully flows through the control valve 72. When the control valve 72 is in this position bleed air 74 is not mixed with air 90 (e.g., the bleed air that has cooled the inner case structure 78). As such, this un-mixed bleed air flow (illustrated by the dashed lines 98 is provided to the turbine section (e.g., low pressure turbine, mid-turbine frame, etc.) or buffer cooler of the gas turbine engine 20.

Figures 4, 5:
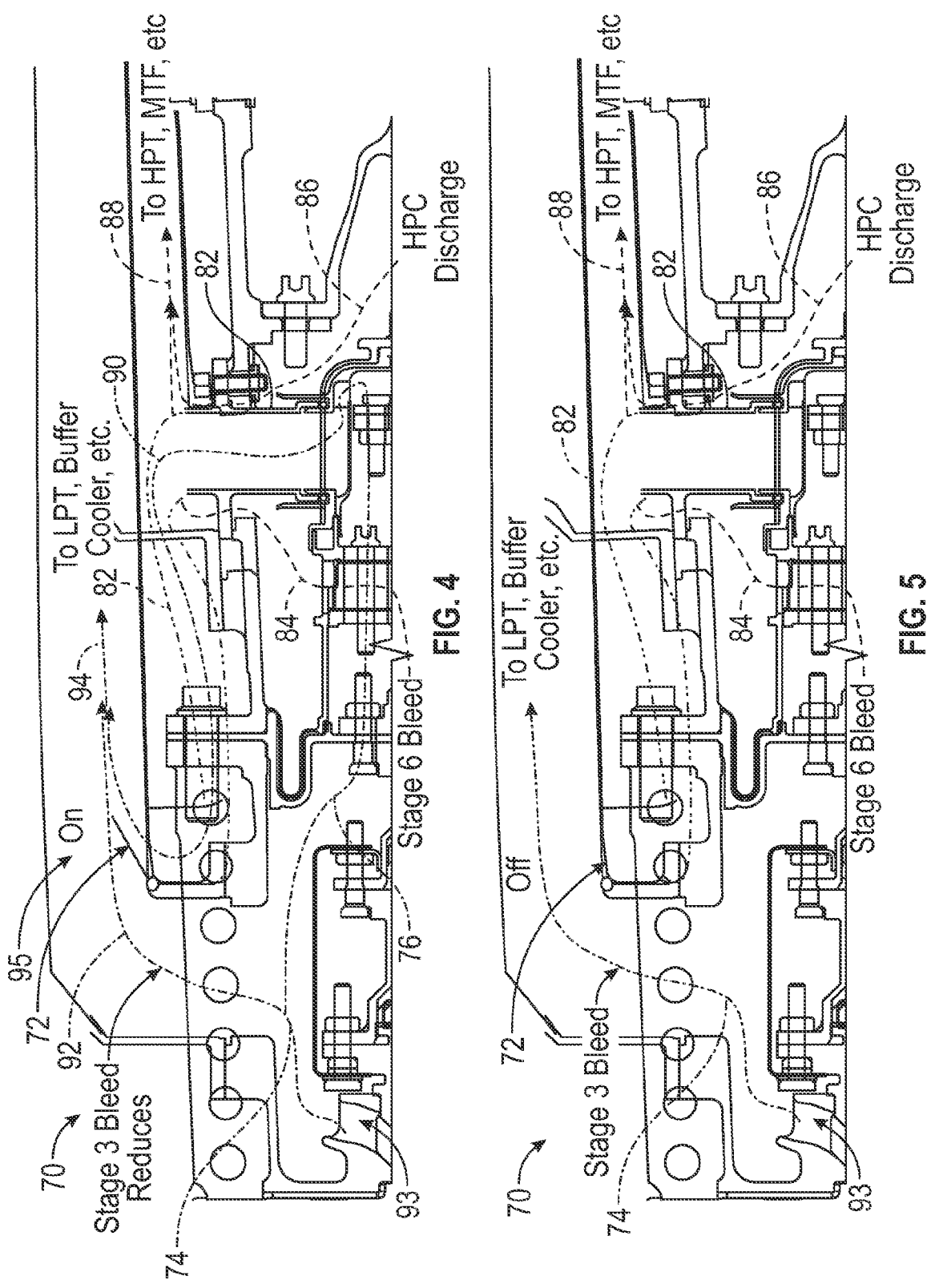
FIG. 4 is a view of a compressor clearance control system according to an embodiment with a control valve of the compressor clearance control system in a first position or on position.
FIG. 5 is a view of a compressor clearance control system of FIG. 4 with a control valve of the compressor clearance control system in a second position or off position.

Referring now to at least FIGS. 4 and 5 and in one embodiment, the control valve or valves 72 may be a butterfly valve. As such and when the control valve 72 is in the first position or on position (FIGS. 2 and 4) the control valve 72 causes a cross-sectional area of a position 95 receiving the bleed air 74 to be constrained and thus forcing a portion of the bleed air 74 to be the redirected bleed air 76 that is forced towards the inner case structure 78 and ultimately back to the control valve 72 via the insulated pipe or pipes 82, portions of which are illustrated by dashed lines in FIGS. 4 and 5. Thereafter and when the control valve 72 is in the second position or off position (FIGS. 3 and 5) the control valve 72 causes the cross-sectional area of position 95 receiving the bleed air to be increased as the butterfly valve is in the closed position and the bleed air 74 is passed into plenum 95 without causing any of the bleed air 74 to be redirected as redirected bleed air 76 towards the inner case structure 78.

As mentioned above and in one embodiment, the clearance control system 70 may include a plurality of control valves 72 each being located on an exterior surface of the compressor case. See for example, FIG. 6 wherein a plurality of plurality of control valves 72 are illustrated schematically. In the embodiment depicted in FIG. 6, each individual control valve 72 is only in fluid communication with a single insulated pipe 82 (e.g., one control valve 72 for each insulated pipe 82).

Figure 7:
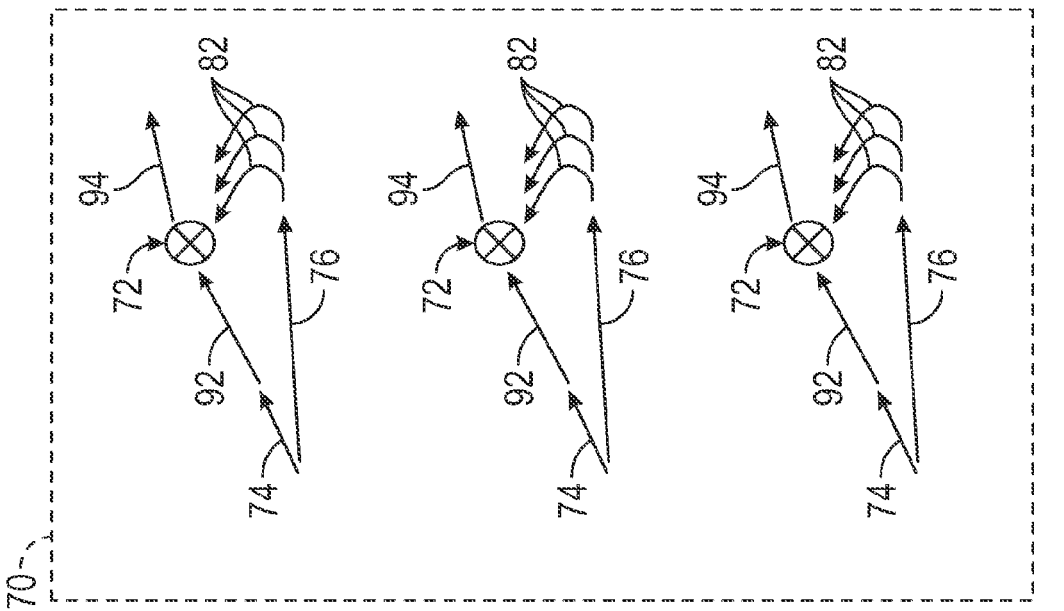
FIG. 7 is a schematic illustration of the compressor clearance control system according to another embodiment with control valves of the compressor clearance control system in a first position or on position.

Referring now to FIG. 7 an alternative embodiment is illustrated schematically. Here the clearance control system 70 may include a plurality of control valves 72. However, each individual control valve 72 is in fluid communication with a plurality of insulated pipes 82 (e.g., one control valve 72 for a plurality of insulated pipes 82).

Figure 6:
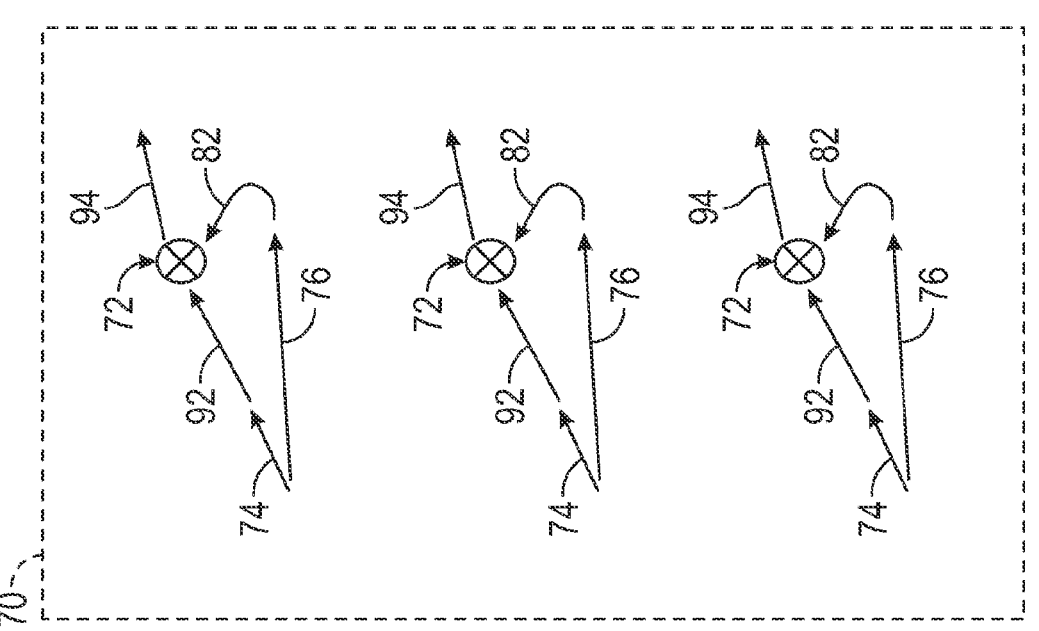
FIG. 6 is a schematic illustration of the compressor clearance control system according to an embodiment with control valves of the compressor clearance control system in a first position or on position.

In FIGS. 6 and 7, control valves 72 of the clearance control system 70 are illustrated in the first position or on position, wherein the redirected bleed air 76 is directed towards the inner case structure 78 and ultimately back to the control valve or valves 72 via the insulated pipe or pipes 82.

In FIG. 8, the plurality of control valves 72 of the clearance control system 70 are illustrated in the second position or off position wherein the bleed air 74 is passed into position 95 without causing any redirected bleed air 76 to be directed towards the inner case structure 78.

Alternatively and in order to reduce the number of control valves 72 and in another embodiment, the clearance control system 70 may comprise a plurality of insulated pipes 82 (e.g., more than one) that are in fluid communication with a single control valve 72. See for example, FIG. 9 wherein the clearance control system 70 is illustrated with a single control valve 72 that is fluidly coupled to a plurality of insulated pipes 82. In FIG. 9, the single control valve 72 is illustrated in the first position or on position wherein the redirected bleed air 76 is directed towards the inner case structure 78 and ultimately back to the control valve 72 via the insulated pipe or pipes 82. In FIG. 10, the single control valve 72 of the embodiment of FIG. 9 is illustrated in the second position wherein the bleed air 74 is passed into position 95 without causing any redirected bleed air 76 to be directed towards the inner case structure 78.

Of course, numerous other configurations are considered to be within the scope of the present disclosure.

Accordingly, an apparatus and method of cooling a portion of a high pressure compressor of a gas turbine engine is provided, wherein a control valve or valves of a clearance control system is fluidly coupled to a source of bleed air of the high pressure compressor, and the control valve or valves is/are configured for movement between a first position or on position and a second position or off position. During operation of the control valve or valves a portion of the source of bleed air is directed towards an inner case structure of the high pressure compressor and thereafter an insulated pipe or a plurality of insulated pipes when the control valve or valves is/are in the first position or the on position and the source of bleed air is not redirected towards the inner case structure of the high pressure compressor and the insulated pipe or the plurality of insulated pipes when the control valve or valves is/are in the second position of the off position.

The term "about" is intended to include the degree of error associated with measurement of the particular quantity based upon the equipment available at the time of filing the application. For example, "about" can include a range of #8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A high pressure compressor for a gas turbine engine, comprising:

a clearance control system, the clearance control system comprising:

a control valve fluidly coupled to a source of bleed air of the high pressure compressor, the control valve configured for movement between a first position and a second position;

an insulated pipe fluidly coupled to the control valve; and wherein the control valve redirects a portion of the source of bleed air towards an inner case structure of the high pressure compressor and thereafter to the insulated pipe when the control valve is in the first position and wherein the source of bleed air is not redirected towards the inner case structure of the high pressure compressor and the insulated pipe when the control valve is in the second position, wherein the insulated pipe is located between the inner case structure and an outer case structure of the high pressure compressor.

2. The high pressure compressor as in claim 1, wherein the source of bleed air is from a stage 3 of the high pressure compressor.

3. The high pressure compressor as in claim 1, wherein the inner case structure is a stage 6 inner case structure of the high pressure compressor.

4. The high pressure compressor as in claim 1, wherein the control valve is one of a plurality of control valves and the insulated pipe is one of a plurality of insulated pipes, each of the plurality of insulated pipes being fluidly coupled to the one of the plurality of control valves.

5. The high pressure compressor as in claim 1, wherein the control valve is only a single control valve and the insulated pipe is one of a plurality of insulated pipes, each of the plurality of insulated pipes being fluidly coupled to the single control valve.

6. The high pressure compressor as in claim 1, wherein the source of bleed air is redirected to the control valve without being mixed with any other source of bleed air.

7. The high pressure compressor as in claim 1, wherein the insulated pipe thermally insulates the redirected portion of the source of bleed air from other sources of bleed air that are at a higher temperature than the redirected portion of the source of bleed air.

8. The high pressure compressor as in claim 1, wherein the control valve mixes the redirected portion of the source of bleed air with a portion of the source of bleed air that has not been redirected to provide a source of mixed bleed air, when the control valve is in the first position.

9. A gas turbine engine, comprising:

a fan section;

a compressor section, the compressor section having a low pressure compressor and a high pressure compressor;

a combustor section;

a turbine section; and wherein the high pressure compressor includes a clearance control system, the clearance control system comprising:

a control valve fluidly coupled to a source of bleed air of the high pressure compressor, the control valve configured for movement between a first position and a second position;

an insulated pipe fluidly coupled to the control valve; and wherein the control valve redirects a portion of the source of bleed air towards an inner case structure of the high pressure compressor and thereafter to the insulated pipe when the control valve is in the first position and wherein the source of bleed air is not redirected towards the inner case structure of the high pressure compressor and the insulated pipe when the control valve is in the second position, wherein the insulated pipe is located between the inner case structure and an outer case structure of the high pressure compressor.

10. The gas turbine engine as in claim 9, wherein the source of bleed air is from a stage 3 of the high pressure compressor.

11. The gas turbine engine as in claim 9, wherein the inner case structure is a stage 6 inner case structure of the high pressure compressor.

12. The gas turbine engine as in claim 9, wherein the control valve is one of a plurality of control valves and the insulated pipe is one of a plurality of insulated pipes, each of the plurality of insulated pipes being fluidly coupled to the one of the plurality of control valves.

13. The gas turbine engine as in claim 12, wherein the control valve is only a single control valve and the insulated pipe is one of a plurality of insulated pipes, each of the plurality of insulated pipes being fluidly coupled to the single control valve.

14. The gas turbine engine as in claim 9, wherein the source of bleed air is redirected to the control valve without being mixed with any other source of bleed air.

15. The gas turbine engine as in claim 9, wherein the insulated pipe thermally insulates the redirected portion of the source of bleed air from other sources of bleed air that are at a higher temperature than the redirected portion of the source of bleed air.

16. The gas turbine engine as in claim 9, wherein the control valve mixes the redirected portion of the source of bleed air with a portion of the source of bleed air that has not been redirected to provide a source of mixed bleed air, when the control valve is in the first position.

17. The gas turbine engine as in claim 16, wherein the source of mixed bleed air is provided to the turbine section.

18. A method of cooling a portion of a high pressure compressor of a gas turbine engine, comprising:

fluidly coupling a control valve fluidly of a clearance control system to a source of bleed air of the high pressure compressor, the control valve configured for movement between a first position and a second position;

fluidly coupling an insulated pipe to the control valve; and redirecting a portion of the source of bleed air towards an inner case structure of the high pressure compressor and thereafter the insulated pipe when the control valve is in the first position and wherein the source of bleed air is not redirected towards the inner case structure of the high pressure compressor and the insulated pipe when the control valve is in the second position, wherein the insulated pipe is located between the inner case structure and an outer case structure of the high pressure compressor.

19. The method as in claim 18, wherein the source of bleed air is from a stage 3 of the high pressure compressor, and wherein the control valve is one of a plurality of control valves and the insulated pipe is one of a plurality of insulated pipes, each of the plurality of insulated pipes being fluidly coupled to the one of the plurality of control valves.

20. The method as in claim 18, wherein the inner case structure is a stage 6 inner case structure of the high pressure compressor, and wherein the control valve is only a single control valve and the insulated pipe is one of a plurality of insulated pipes, each of the plurality of insulated pipes being fluidly coupled to the single control valve.

\* \* \* \* \*